United States Patent
Herman et al.

(10) Patent No.: US 10,065,814 B2
(45) Date of Patent: Sep. 4, 2018

(54) TRANSPORTABLE RECEIVING AND STORAGE SYSTEM WITH REDUNDANCY

(71) Applicant: Quickthree Solutions, Inc., Saskatoon (CA)

(72) Inventors: Alvin Herman, Saskatoon (CA); Erin Herman, Clavet (CA)

(73) Assignee: Quickthree Technology, LLC, Yardley, PA (US)

( * ) Notice: Subject to any disclaimer, the term of this patent is extended or adjusted under 35 U.S.C. 154(b) by 258 days.

(21) Appl. No.: 15/079,277

(22) Filed: Mar. 24, 2016

(65) Prior Publication Data
US 2016/0280467 A1  Sep. 29, 2016

(30) Foreign Application Priority Data

Mar. 24, 2015 (CA) ...................................... 2885668

(51) Int. Cl.
*B65G 65/32* (2006.01)
*B65G 47/58* (2006.01)
(Continued)

(52) U.S. Cl.
CPC ........... *B65G 65/32* (2013.01); *B65G 17/126* (2013.01); *B65G 41/00* (2013.01); *B65G 47/58* (2013.01); *B65G 2201/042* (2013.01)

(58) Field of Classification Search
CPC ........ B65G 3/04; B65G 17/126; B65G 17/36; B65G 41/00; B65G 41/001; B65G 41/002; B65G 41/003; B65G 41/005; B65G 47/58; B65G 65/30; B65G 65/32; B65G 2201/042
See application file for complete search history.

(56) References Cited

U.S. PATENT DOCUMENTS 4,187,047 A * 2/1980 Squifflet, Sr. ............. B60P 1/64
414/332
4,249,351 A * 2/1981 Brock .................... B65D 88/30
414/332
(Continued)

FOREIGN PATENT DOCUMENTS

CA  2795055 A1  5/2014

*Primary Examiner* — Gene O Crawford
*Assistant Examiner* — Keith Campbell
(74) *Attorney, Agent, or Firm* — Sheehan Phinney Bass & Green PA

(57) ABSTRACT

A transportable system for receiving, storing, and distributing granular material includes a surge bin with two storage compartments. A distribution conveyor assembly is movably mounted to the surge bin, has two conveyors, and can be manipulated to discharge into selected adjacent bins. An elevating conveyor assembly has two conveyors and each can discharge into either compartment of distribution conveyor and into either of the distribution conveyors. A receiving conveyor assembly has first and second receiving conveyors configured to receive granular material from side by side transport vehicles at the same time and deliver same to the input of either elevating conveyor. A surge bin output diverter assembly can receive granular material from either one of the storage compartments and direct same into either one of the first and second elevating conveyors for elevating to either one of the distribution conveyors.

19 Claims, 4 Drawing Sheets

(51) Int. Cl.
*B65G 17/12* (2006.01)
*B65G 41/00* (2006.01)

(56) References Cited

U.S. PATENT DOCUMENTS

| | | | | |
|---|---|---|---|---|
| 4,561,821 A * | 12/1985 | Dillman | ................ | B65D 88/30 |
| | | | | 414/332 |
| 9,663,303 B2 * | 5/2017 | Waldner | ................ | B65G 41/002 |
| 9,752,389 B2 * | 9/2017 | Pham | ................ | E21B 15/00 |
| 2013/0142601 A1 | 6/2013 | McIver et al. | | |
| 2014/0044508 A1 * | 2/2014 | Luharuka | ................ | E21B 15/00 |
| | | | | 414/293 |
| 2015/0368036 A1 * | 12/2015 | Bromley | ................ | B65D 90/02 |
| | | | | 414/299 |
| 2016/0221761 A1 * | 8/2016 | Walder | ................ | B65G 17/126 |
| 2016/0244268 A1 * | 8/2016 | Ritter | ................ | B65G 41/002 |
| 2017/0130808 A1 * | 5/2017 | Pham | ................ | F16H 25/20 |

* cited by examiner

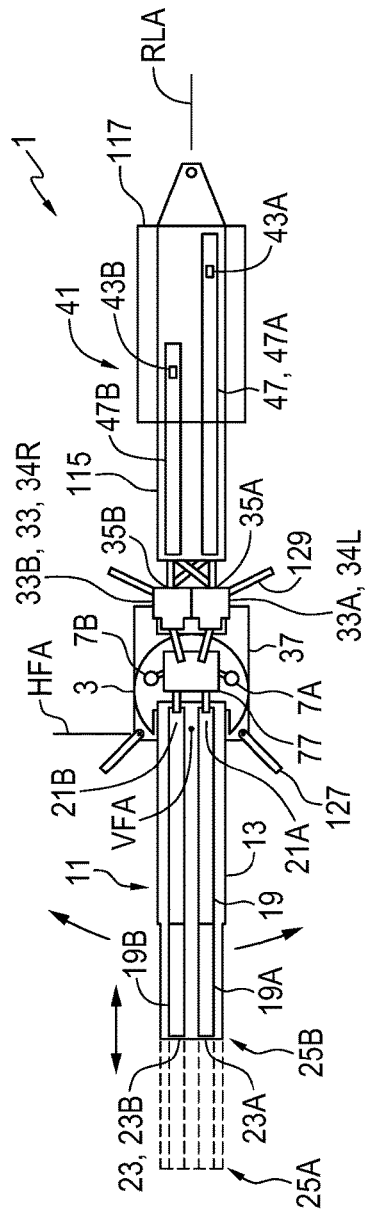
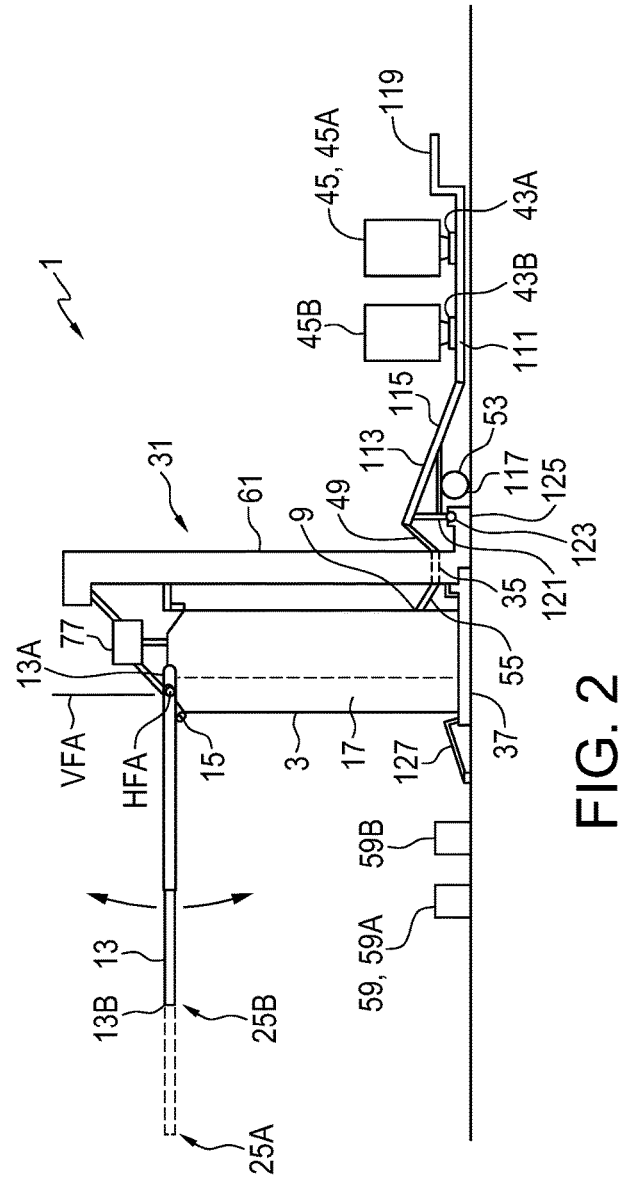
FIG. 1
FIG. 2

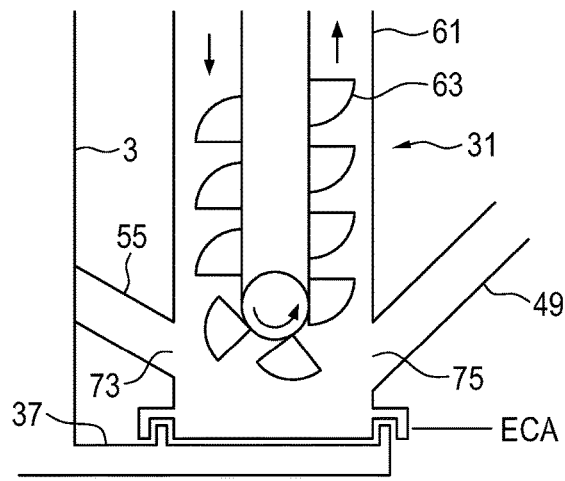
FIG. 10
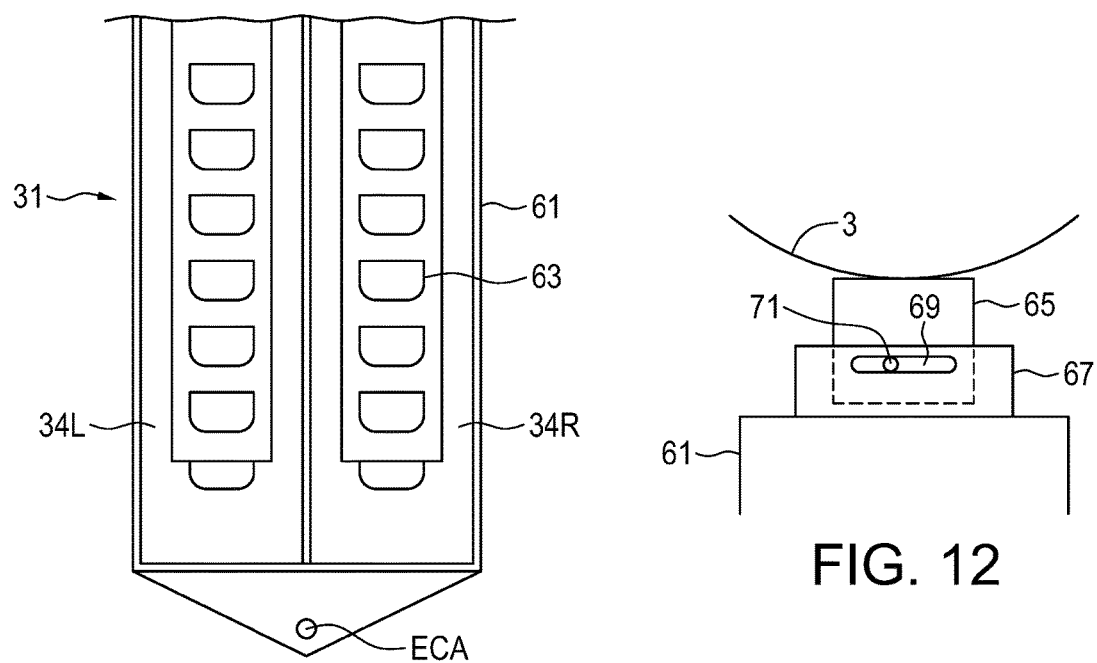
FIG. 11
FIG. 12

TRANSPORTABLE RECEIVING AND STORAGE SYSTEM WITH REDUNDANCY

FIELD

This disclosure relates to the field of field of material handling and in particular a transportable system for receiving and storing granular material.

BACKGROUND

In industries such as oil and gas formation fracturing operations large quantities of bulk granular material must be temporarily stored at a work site. In oil and gas fracking operations underground formations are fractured by injecting very large volumes of a slurry of water, frac sand, and various chemicals at high pressure into the formation. Such fracking operations can require very large amounts of frac sand, which must be gathered and stored in temporary facilities set up at the work site. Such fracking operations can require on site storage of thousands of tons of frac sand, as well as corresponding large quantities of water.

Such temporary work sites require a large volume of granular material storage with conveyors for transferring the granular material from transport vehicle into storage bins and then from the bins to a use location. An example of such a storage and handling system is disclosed for example in United States Published Patent Application Number 2013/0142,601 of McIver et al. and Canadian Patent Application Number 2,795,055 of the present inventor Herman.

SUMMARY

The present disclosure provides a transportable system for receiving and storing granular material that overcomes problems in the prior art.

Once a fracking operation has begun, it is necessary to keep the high pressure flow of the slurry flowing until the operation is complete.

The present disclosure provides a transportable system for receiving, storing, and distributing granular material. The system comprises an elongate surge bin with a middle wall dividing an interior of the surge bin into first and second storage compartments with corresponding first and second top input openings and first and second bottom output openings, the surge bin configured to be transported in a horizontal orientation and raised to a vertically oriented operating position at a work site. A distribution conveyor assembly comprises a distribution frame with an input end and an output end, the distribution frame pivotally attached at the input end thereof to an upper portion of the surge bin. A distribution frame actuator is operative to pivot the distribution frame from a transport position extending downward along a wall of the surge bin to an operating position extending laterally from the upper portion of the surge bin, and operative, when the distribution frame is in the operating position, to pivot the distribution frame about a substantially vertical frame pivot axis and about a substantially horizontal frame pivot axis. First and second distribution conveyors are mounted on the distribution frame such that corresponding first and second distribution conveyor inputs are adjacent to the input end of the distribution frame and corresponding first and second distribution conveyor outputs are adjacent to the output end of the distribution frame and adjacent to each other. An elevating conveyor assembly comprises a first elevating conveyor operative to receive granular material at a first elevating input and discharge the received granular material selectively into any one of the first top input opening, the second top input opening, the first distribution conveyor input, and the second distribution conveyor input and a second elevating conveyor operative to receive granular material at a second elevating input and discharge the received granular material selectively into any one of the first top input opening, the second top input opening, the first distribution conveyor input, and the second distribution conveyor input. The elevating conveyor assembly is configured to be transported in a horizontal orientation and raised to an operating position attached to a side of the surge bin opposite the distribution conveyor assembly and supported on a base of the surge bin. A receiving conveyor assembly comprises a first receiving station configured to receive granular material from a discharge of a first transport vehicle and a second receiving station configured to receive granular material from a discharge of a second transport vehicle at the same time the first receiving station is receiving granular material from the discharge of the first transport vehicle. A first receiving conveyor is operative to transfer granular material from the first receiving station selectively into either one of the first and second elevating inputs, and a second receiving conveyor is operative to transfer granular material from the second receiving station selectively into either one of the first and second elevating inputs. The receiving conveyor assembly is configured to be transported to the work site on wheels and attached to the elevating conveyor assembly in an operating position. A surge bin output diverter assembly is operative to selectively receive granular material from either one of the first and second bottom output openings of the surge bin and direct the received granular material into either one of the first and second elevating inputs.

The disclosed transportable system for receiving, storing, and distributing granular material provides redundancy such that receiving, storing and distributing granular material can continue at a reduced rate in the event of a failure of one of the conveyors. The risk that continuous operations such as fracking might be interrupted is reduced. The surge bin, elevating conveyor assembly, receiving conveyor assembly can be supported on one another and engaged together to provide increased stability and resist wind forces and the like which can be significant on such tall structures.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 1 is a schematic top view of an embodiment of a transportable system of the present disclosure for receiving, storing, and distributing granular material;

FIG. 2 is a schematic side view of the embodiment of FIG. 1;

FIG. 10 is a schematic cut away side view of the elevating conveyor assembly of the embodiment of FIG. 1;

FIG. 11 is a schematic cut away front view of the bucket elevators of the elevating conveyor assembly of the embodiment of FIG. 1; and FIG. 12 is a schematic top view of the adjustable attachment mechanism of the embodiment of FIG. 1 for connecting the upper portion of the elevating conveyor assembly to the surge bin.

DETAILED DESCRIPTION

Figure 4:
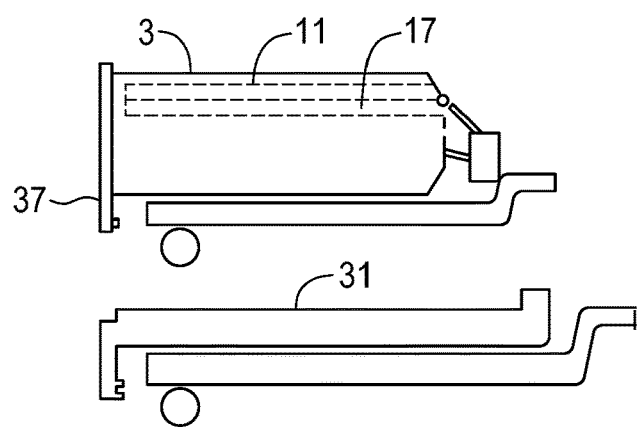
FIG. 4 is a schematic side view of the elevating conveyor assembly and surge tank mounted on trailers for transport to a work site.
Figure 5:
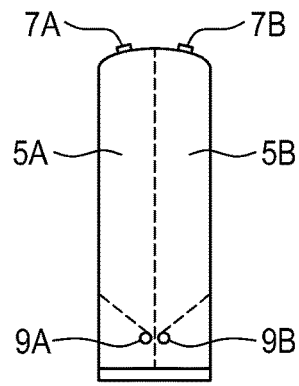
FIG. 5 is a schematic side view of the surge bin of the embodiment of FIG. 1.

FIGS. 1 and 2 schematically illustrate an embodiment of a transportable system 1 of the present disclosure for receiving, storing, and distributing granular material. The system 1 comprises an elongate surge bin 3 with a middle wall dividing an interior of the surge bin into first and second storage compartments 5A, 5B with corresponding first and second top input openings 7A, 7B and first and second bottom output openings 9A, 9B as best seen in FIG. 5. The surge bin 3 is configured to be transported in a horizontal orientation, for example on a trailer as schematically illustrated in FIG. 4, and raised to the vertically oriented operating position shown in FIGS. 1 and 2 at a work site. Providing a surge bin 3 with two separate storage compartments 5A, 5B as schematically illustrated in FIG. 5 allows the system to receive, store, and distribute two different products.

A distribution conveyor assembly 11 comprises a distribution frame 13 with an input end 13A and an output end 13B. The distribution frame 13 is pivotally attached at the input end 13A thereof to an upper portion of the surge bin 3 and a distribution frame actuator 15 is operative to pivot the distribution frame 13 from a transport position shown in FIG. 4 extending downward along a wall of the surge bin 3 to an operating position shown in FIGS. 1 and 2 extending laterally from the upper portion of the surge bin 3. In the illustrated system 1 when in the transport position the distribution conveyor assembly 11 is located in a recess 17 in the wall of the surge bin 3.

When the distribution frame 13 is in the operating position, the distribution frame actuator 15 is operative to pivot the distribution frame about a substantially vertical frame pivot axis VFA and about a substantially horizontal frame pivot axis HFA. First and second distribution conveyors 19A, 19B are mounted on the distribution frame such that corresponding first and second distribution conveyor inputs 21A 21B are adjacent to the input end 13A of the distribution frame 13 and corresponding first and second distribution conveyor outputs 23A, 23B are adjacent to the output end 13B of the distribution frame 13 and adjacent to each other.

Figure 6:
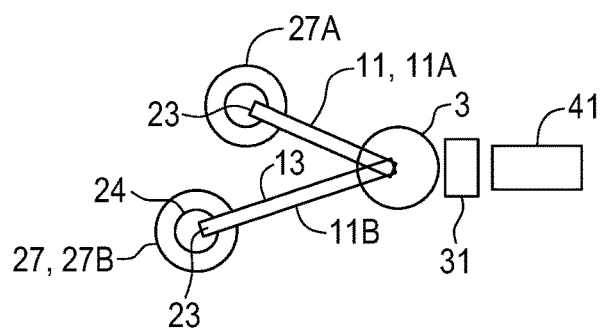
FIG. 6 is a schematic top view of the embodiment of FIG. 1 including first and second storage bins showing how the distribution conveyor assembly can be moved to deposit granular material into such storage bins.

In the illustrated system 1 the distribution frame 13 of the distribution conveyor assembly 11 is extendable such that the distribution conveyor outputs 23 are movable from an inner location 25A, closest to the surge bin 3, to an outer location 25B. In a typical installation the system 1 will further comprise, as schematically illustrated in FIG. 6, first and second storage bins 27A, 27B, and the distribution conveyor assembly 11 is movable from a first storage bin loading position 11A, where the distribution conveyor outputs 23 are oriented to discharge granular material into the first storage bin 27A. Once the outputs 23 are in position the distribution frame actuator 15 is activated to pivot the distribution frame 13 about the horizontal frame pivot axis HFA to lower output end 13B of the distribution frame 13 so it rests on the bin 27A. Resting the distribution frame 13 on the storage bin 27A stabilizes the entire system 1 to resist wind loads.

Figure 7:
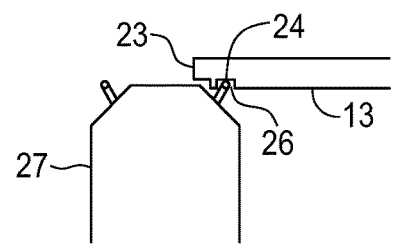
FIG. 7 is a schematic side view showing the distribution frame of the distribution conveyor assembly of the embodiment of FIG. 1 engaged in a lock mechanism to prevent movement of the distribution conveyor assembly with respect to the storage bin being filled.

The distribution conveyor assembly 11 can also be extended as required and raised or lowered to a second storage bin loading position 11B to orient the distribution conveyor outputs 23 to discharge granular material into the second storage bin 27B, and maneuvered to rest on the second bin 27B. As indicated by the arrows in FIGS. 1 and 2 the distribution conveyor assembly 11 can be maneuvered laterally and horizontally to transfer granular material into a significant plurality of storage bins 27. As schematically illustrated in FIG. 7, rather than simply resting on the storage bin 27 the distribution frame 13 can be configured to engage a lock mechanism on the storage bins 27 to prevent movement of the distribution frame 13 with respect to the storage bins 27. The lock mechanism can be provided by a rail 24 mounted to the bin 27 and a recess 26 in a bottom of the distribution frame 13 configured to engage the rail 24.

The system 1 also comprises an elevating conveyor assembly 31 comprising a first elevating conveyor 33A operative to receive granular material at a first elevating input 35A and discharge the received granular material selectively into any one of the first top input opening 7A, the second top input opening 7B, the first distribution conveyor input 21A, and the second distribution conveyor input 21B. A second elevating conveyor 33B is operative to receive granular material at a second elevating input 35B and is also operative to discharge the received granular material selectively into any one of the first top input opening 7A, the second top input opening 7B, the first distribution conveyor input 21A, and the second distribution conveyor input 21B.

The elevating conveyor assembly 31 is configured to be transported in a horizontal orientation, for example on a trailer as schematically illustrated in FIG. 4, and raised to an operating position attached to a side of the surge bin 3 opposite the distribution conveyor assembly 11 and supported on a base 37 of the surge bin 3.

The elevating conveyor assembly 31 is fed by a receiving conveyor assembly 41 comprising a first receiving station 43A configured to receive granular material from a discharge of a first transport vehicle 45A and a second receiving station 43B configured to receive granular material from a discharge of a second transport vehicle 45B at the same time the first receiving station 43A is receiving granular material from the discharge of the first transport vehicle 45A. As seen in FIG. 2 the transport vehicles 45 can be positioned side by side and discharge at the same time.

Figure 8:
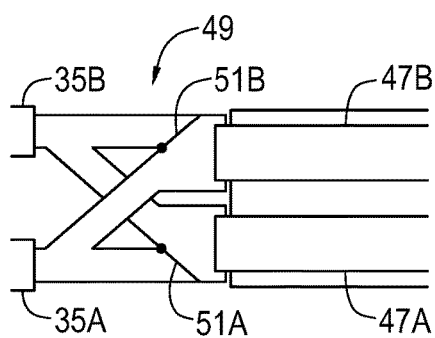
FIG. 8 is a schematic top view of the receiver diverter assembly of the embodiment of FIG. 1.

A first receiving conveyor 47A is operative to transfer granular material from the first receiving station 43A selectively into either one of the first and second elevating inputs 35A, 35B. A second receiving conveyor 47B is operative to transfer granular material from the second receiving station 43A selectively into either one of the first and second elevating inputs 35A, 35B FIG. 8 schematically illustrates a receiver diverter assembly 49 operative to receive granular material from the receiving conveyors 47 and, by moving valve plates 51A, 51B to one side or the other, direct flow from either receiving conveyor 47 into either elevating input 35. The receiving conveyor assembly 41 is configured to be transported to the work site on wheels 53 and attached to the elevating conveyor assembly 31 in the operating position schematically illustrated in FIGS. 1 and 2.

Figure 9:
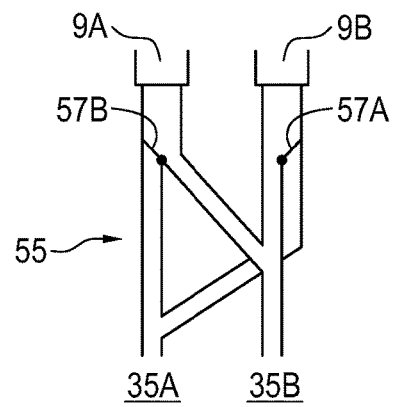
FIG. 9 is a schematic top view of the surge bin output diverter assembly of the embodiment of FIG. 1.

Similarly a surge bin output diverter assembly 55 is schematically illustrated in FIG. 9 and is operative to selectively receive granular material from either one of the first and second bottom output openings 9A, 9B of the surge bin and direct the received granular material into either one of the first and second elevating inputs 35A, 35B by moving valve plates 57A, 57B to one side or the other.

The system 1 thus provides a totally redundant system where a fault with any one of the conveyors 19, 33, 47 still allows movement at half capacity through the system 1. To further ensure redundancy, first and second power sources 59A, 59B are provided, each power source 59 operative to power the distribution frame actuator 15, at least one of the first and second distribution conveyors 19, at least one of the first and second elevating conveyors 33, and at least one of the first and second receiving conveyors 47 at the same time. Each power source 59 is connectable to power the distribution frame actuator 15, both of the distribution conveyors 19A, 19B, both of the elevating conveyors 33A, 33B, and both of the receiving conveyors 47A, 47B.

The first and second elevating conveyors 33A, 33B of the elevating conveyor assembly 31 are conveniently provided by right and left bucket elevators 34R, 34L that are oriented vertically when in the operating position. Such bucket elevators 34 provide high capacity and since they are oriented vertically when in an operating position they occupy a relatively small area of the work site, an important consideration in some crowded areas where space is limited.

As schematically illustrated in FIGS. 10 and 11 the right and left bucket elevators 34R, 34L are mounted side by side in an elevator housing 61 with upward moving buckets 63 thereof facing away from the surge bin 3. In order to operate to maximum capacity the bucket elevators 34R, 34L must be oriented vertically so that the buckets 63 are horizontal and will fill to capacity. If the buckets 63 are not horizontal granular material spill out the low side and a lesser amount of material is carried in each bucket 63, reducing capacity.

The elevator housing 61 is supported on the base 37 of the surge bin 3 and is attached at an upper portion thereof to the surge bin 3 by an adjustable attachment mechanism such that the upper portion thereof can be adjusted right and left to ensure that right and left sides of the buckets 63 are at the same vertical level, and thus horizontal for maximum capacity. In the adjustable attachment mechanism schematically illustrated in FIG. 12 a bin plate 65 extends from an upper portion of the surge bin 3 and a bucket plate 67 extends from the elevator housing 61. Slots 69 in the plates 65, 67 allow the housing 61 to be moved right and left as required to achieve the desired vertical orientation and then bolts 71 or like fasteners are tightened to secure the housing 61 to the surge bin 3.

The elevating conveyor assembly 31 can be pivotally mounted on the base 37 about an elevating conveyor axis ECA to facilitate right and left movement of the upper end of the elevating conveyor assembly 31 while adjusting the elevating conveyor assembly 31 to the vertical orientation. Supporting the elevating conveyor assembly 31 on the base 37 of the surge bin 3 adds stability to the system 1 to resist wind loads and like forces.

The elevating input 35 of each bucket elevator 34 is provided by a rear opening 73 in a bottom portion of the elevator housing 61 connected to the surge bin output diverter assembly 55 to receive material from either of the storage compartments 5A, 5B, and a front opening 75 in the bottom portion of the elevator housing 61 is connected to the receiver diverter assembly 49 to receive granular material from the first and second receiving conveyor discharges.

Figure 3:
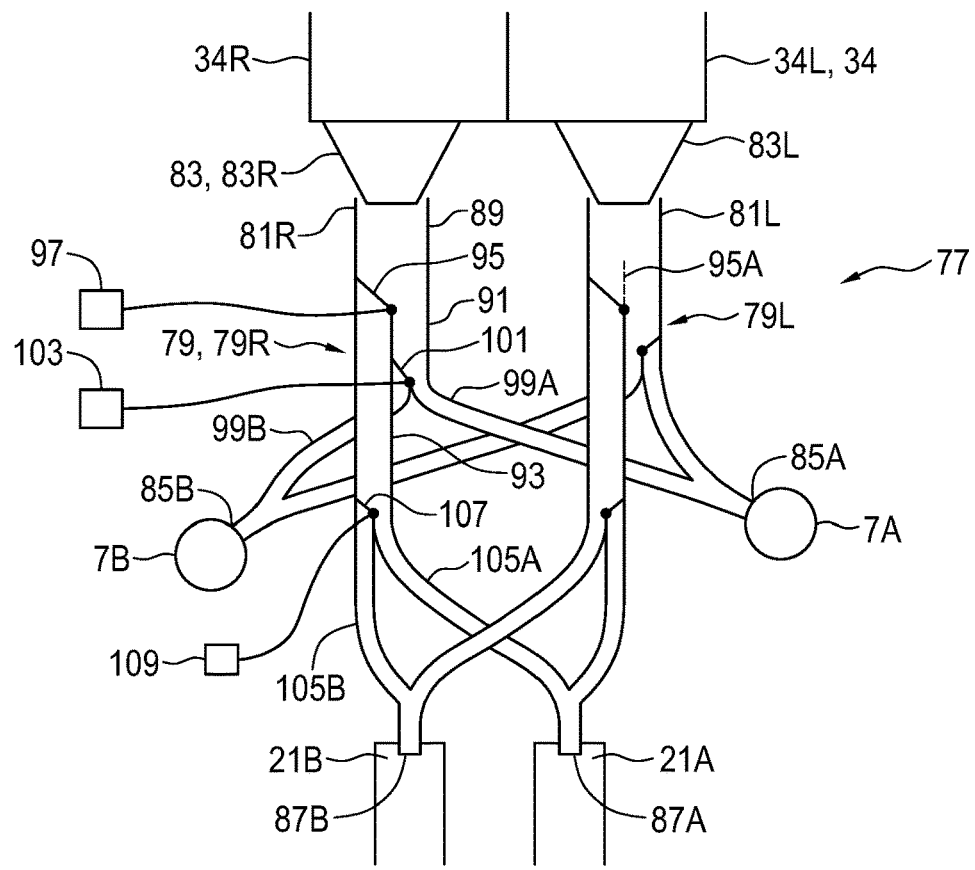
FIG. 3 is schematic cut away top view of the elevating discharge diverter assembly of the embodiment of FIG. 1.

The right and left bucket elevators 34R, 34L discharge into an elevating discharge diverter assembly 77 as schematically illustrated in FIG. 3. The illustrated elevating discharge diverter assembly 77 comprises a right diverter portion 79R with an input end 81R thereof connected to receive granular material from a right discharge 83R of the right bucket elevator 34R, and a left diverter portion 79L with an input end 81L thereof connected to receive granular material from a left discharge 83L of the left bucket elevator 34L.

Each of the right and left diverter portions 79 comprises a first bin diverter output 85A oriented to discharge into the first top input opening 7A of the surge bin 3, a second bin diverter output 85B oriented to discharge into the second top input opening 7B of the surge bin 3, a first conveyor diverter output 87A oriented to discharge into the first distribution conveyor input 21A, and a second conveyor diverter output 87B oriented to discharge into the second distribution conveyor input 21B. A valve mechanism is operative to direct granular material from the input end of the diverter portion to a selected one of the first bin diverter output 85A, the second bin diverter output 85B, the first conveyor diverter output 87A, and the second conveyor diverter output 87B.

In the illustrated elevating discharge diverter assembly 77 each diverter portion 79 comprises a discharge conduit 89 connected at an input end thereof to the discharge 83 of the corresponding bucket elevator 34. A main bin conduit 91 and a main conveyor conduit 93, each has an input end thereof connected to the output end of the discharge conduit 89 through a main valve 95, and a main valve control 97 is operative to move the main valve from a bin position, where granular material flows from the discharge conduit 89 into the main bin conduit 91, to a conveyor position where granular material flows from the discharge conduit 89 into the main conveyor conduit 93.

First and second bin conduits 99A, 99B, each has an input end thereof connected to an output end of the main bin conduit 91 through a bin valve 101, and a bin valve control 103 operative to move the bin valve 101 from a first position, where granular material flows from the main bin conduit 91 through the first bin conduit 99A to the first bin diverter output 85A, to a second position where granular material flows from the main bin conduit 91 through the second bin conduit 99B to the second bin diverter output 85B.

First and second conveyor conduits 105A, 105B, each have an input end thereof connected to an output end of the main conveyor conduit 93 through a conveyor valve 107, and a conveyor valve control 109 is operative to move the conveyor valve 107 from a first position, where granular material flows from the main conveyor conduit 93 through the first conveyor conduit 105A to the first conveyor diverter output 87A, to a second position where granular material flows from the main conveyor conduit 93 through the second conveyor conduit 105B to the second conveyor diverter output 85B.

The elevating discharge diverter assembly 77 thus allows either bucket elevator 34R, 34L to discharge into either top bin opening 7A, 7B or either distribution conveyor input 21A, 21B.

The main valve control 97 can also be operated to put the main valve 95 into an intermediate position 95A such that the main valve 95 proportionately divides the total product flow from the bucket elevator 34 through the discharge conduit 89 between the main bin conduit 91 and the main conveyor conduit 93. Thus a portion of the discharge from the bucket elevator 34 can be directed into either of the storage compartments 5A, 5B of the surge bin 3, and a portion can be directed to either of the distribution conveyors 19A, 19B.

In some applications of the present disclosure it will be desired to transfer granular material from transport vehicles 45 into the storage bins 27 as quickly as possible, The bucket elevators 34 may then have a have a higher capacity than the distribution conveyors 19 and when unloading from the transport vehicles 45 the main valve can be positioned to direct material into the distribution conveyor 19 that is equal to their maximum capacity, while the balance of the discharge from the bucket elevators 34 is directed into the surge bin 3. When one transport vehicle is empty and during the time period while another is moved into position to unload, the bucket elevator 34 can be fed from the surge bin 3 through the surge bin output diverter assembly 55 so that the flow of product on the distribution conveyor 19 can be maintained until the next transport vehicle 45 is in position to unload.

In the illustrated system 1 the first and second receiving conveyors 47A, 47B extend outward from the elevating conveyor assembly 31 in a direction opposite to the surge bin 3 and each comprise, when the receiving conveyor assembly 41 is in the operating position, a horizontal outer portion 111 and an inner inclined portion 113 sloping upward from an inner end of the outer portion 111.

The horizontal outer portions 111 of the receiving conveyors 47 are mounted side by side in a receiver housing 115 that is supported on a ground surface when in the operating position, and comprising ramps 117 on each side of the receiver housing 115. The ramps 117 are configured to enable the transport vehicles 45 to drive over the receiver housing 115 in a direction substantially perpendicular to a longitudinal axis RLA of the receiver housing 115.

The receiver housing 115 defines a first opening above the first receiving conveyor 47A to provide the first receiving station 43A, and a second opening above the second receiving conveyor 47B to provide the second receiving station 43B. The first and second receiving stations 43A, 43B are spaced along the receiver housing 115 such that the first and second transport vehicles 45A, 45B discharge into the corresponding first and second receiver stations 43A, 43B at the same time.

The inclined inner portions 113 of the receiving conveyors 47 are mounted in the receiver housing 115, and the receiving conveyor assembly 41 comprises a plurality of wheels 117 rotatably mounted thereto under the inclined inner portions 113 of the receiving conveyors 47. The wheels 117 are oriented to roll in a direction substantially aligned with the longitudinal axis RLA of the receiver housing 115, and a hitch assembly 119 on the outer end of the receiver housing 115 is adapted for attachment to a towing vehicle to tow the receiving conveyor assembly 41 in a forward direction supported on the wheels 117.

The receiving conveyor assembly 41 comprises a connection bar 121 rearward of the wheels 117. The connection bar 121 is configured to engage recesses 123 in a base 125 of the elevating conveyor assembly 31 when the receiving conveyor assembly 41 is in the operating position. When the receiving conveyor assembly 41 is in the operating position, a rear portion of the receiving conveyor assembly 41 is supported on the connection bar 121 and the base 125 of the elevating conveyor assembly 31. Supporting the receiving conveyor assembly on the base of the elevating conveyor assembly 31 adds stability to the system 1 to resist wind loads and like forces.

Stability to resist wind loads and the like is further enhanced by providing stabilizer legs 127 connected to the surge bin 3 and movable from a stored position in proximity to the surge bin for transport to an extended position extending outward from the surge bin 3.

Further stabilizer legs 129 can similarly be movably connected to the elevating conveyor assembly 31 and movable from a stored position in proximity to the elevating conveyor assembly 31 to an extended position extending outward from the elevating conveyor assembly 31.

The disclosed transportable system 1 of the present disclosure for receiving, storing, and distributing granular material provides redundancy such that receiving, storing and distributing granular material can continue at a reduced rate in the event of a failure of one of the conveyors. The system 1 can receive, store, and distribute two different products at substantially the same time if required. The surge bin 3, elevating conveyor assembly 31, receiving conveyor assembly 41 can be supported on one another and engaged or connected together to provide increased stability and resist wind forces and the like which can be significant on such tall structures.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

The invention claimed is:

1. A transportable system for receiving, storing, and distributing granular material, the system comprising:
   an elongate surge bin with a middle wall dividing an interior of the surge bin into first and second storage compartments with corresponding first and second top input openings and first and second bottom output openings, the surge bin configured to be transported in a horizontal orientation and raised to a vertically oriented operating position at a work site;
   a distribution conveyor assembly comprising:
      a distribution frame with an input end and an output end, the input end of the distribution frame pivotally attached to an upper portion of the surge bin;
      a distribution frame actuator operative to pivot the distribution frame from a transport position extending downward along a wall of the surge bin to an operating position extending laterally from the upper portion of the surge bin, and operative, when the distribution frame is in the operating position, to pivot the distribution frame about a substantially vertical frame pivot axis and about a substantially horizontal frame pivot axis;
      first and second distribution conveyors mounted on the distribution frame such that corresponding first and second distribution conveyor inputs are adjacent to the input end of the distribution frame and corresponding first and second distribution conveyor outputs are adjacent to the output end of the distribution frame and adjacent to each other;
   an elevating conveyor assembly comprising:
      a first elevating conveyor operative to receive granular material at a first elevating input and discharge the received granular material selectively into any one of the first top input opening, the second top input opening, the first distribution conveyor input, and the second distribution conveyor input;

a second elevating conveyor operative to receive granular material at a second elevating input and discharge the received granular material selectively into any one of the first top input opening, the second top input opening, the first distribution conveyor input, and the second distribution conveyor input;

the elevating conveyor assembly configured to be transported in a horizontal orientation and raised to an operating position attached to a side of the surge bin opposite the distribution conveyor assembly and supported on a base of the surge bin;

a receiving conveyor assembly comprising:
a first receiving station configured to receive granular material from a discharge of a first transport vehicle;
a second receiving station configured to receive granular material from a discharge of a second transport vehicle at the same time the first receiving station is receiving granular material from the discharge of the first transport vehicle;
a first receiving conveyor operative to transfer granular material from the first receiving station selectively into either one of the first and second elevating inputs;
a second receiving conveyor operative to transfer granular material from the second receiving station selectively into either one of the first and second elevating inputs;
the receiving conveyor assembly configured to be transported to the work site on wheels and attached to the elevating conveyor assembly in an operating position;

a surge bin output diverter assembly operative to selectively receive granular material from either one of the first and second bottom output openings of the surge bin and direct the received granular material into either one of the first and second elevating inputs.

2. The system of claim 1 comprising first and second power sources, each power source operative to power the distribution frame actuator, at least one of the first and second distribution conveyors, at least one of the first and second elevating conveyors, and at least one of the first and second receiving conveyors at the same time.

3. The system of claim 2 configured such that the each power source is connectable to power the distribution frame actuator, both of the distribution conveyors, both of the elevating conveyors, and both of the receiving conveyors.

4. The system of claim 1 wherein the first and second elevating conveyors of the elevating conveyor assembly comprise right and left bucket elevators oriented substantially vertically when in the operating position.

5. The system of claim 4 wherein the right and left bucket elevators are mounted side by side in an elevator housing and comprise upward moving buckets facing away from the surge bin, and wherein the elevator housing is supported on the base of the surge bin and an upper portion of the elevator housing is attached to the surge bin by an adjustable attachment mechanism such that the upper portion of the elevator housing is adjustable right and left to ensure that right and left sides of the buckets are at the same vertical level.

6. The system of claim 5 wherein the elevating input of each bucket elevator comprises a rear opening in a bottom portion of the elevator housing connected to the surge bin output diverter assembly and a front opening in the bottom portion of the elevator housing connectable to receive granular material from a first discharge of the first receiving conveyor and connectable to receive granular material from a second discharge of the second receiving conveyor.

7. The system of claim 5 comprising an elevating discharge diverter assembly comprising:
a right diverter portion with an input end of the right diverter portion connected to receive granular material from a right discharge of the right bucket elevator, and
a left diverter portion with an input end of the left diverter portion connected to receive granular material from a left discharge of the left bucket elevator;
each of the right and left diverter portions comprising:
a first bin diverter output oriented to discharge into the first top input opening of the surge bin;
a second bin diverter output oriented to discharge into the second top input opening of the surge bin;
a first conveyor diverter output oriented to discharge into the first distribution conveyor input;
a second conveyor diverter output oriented to discharge into the second distribution conveyor input; and
a valve mechanism operative to direct granular material from the input end of the diverter portion to a selected one of the first bin diverter output, the second bin diverter output, the first conveyor diverter output, and the second conveyor diverter output.

8. The system of claim 7 wherein at least one of the right and left diverter portions comprises:
a discharge conduit connected at an input end of the discharge conduit to the discharge of the corresponding bucket elevator;
a main bin conduit and a main conveyor conduit, wherein an input end of the main bin conduit and an input end of the main conveyor conduit are connected to an output end of the discharge conduit through a main valve, and a main valve control operative to move the main valve from a bin position, where granular material flows from the discharge conduit into the main bin conduit, to a conveyor position where granular material flows from the discharge conduit into the main conveyor conduit;
first and second bin conduits, wherein an input end of the first bin conduit and an input end of the second bin conduit are connected to an output end of the main bin conduit through a bin valve, and a bin valve control operative to move the bin valve from a first position, where granular material flows from the main bin conduit through the first bin conduit to the first bin diverter output, to a second position where granular material flows from the main bin conduit through the second bin conduit to the second bin diverter output;
first and second conveyor conduits, wherein an input end of the first conveyor conduit and an input end of the second conveyor conduit are connected to an output end of the main conveyor conduit through a conveyor valve, and a conveyor valve control operative to move the conveyor valve from a first position, where granular material flows from the main conveyor conduit through the first conveyor conduit to the first conveyor diverter output, to a second position where granular material flows from the main conveyor conduit through the second conveyor conduit to the second conveyor diverter output.

9. The system of claim 1 wherein the first and second receiving conveyors extend outward from the elevating conveyor assembly in a direction opposite to the surge bin and wherein the first and second receiving conveyors each comprise, when the receiving conveyor assembly is in the operating position, a substantially horizontal outer portion and an inner inclined portion sloping upward from an inner end of the outer portion.

10. The system of claim 9 wherein the horizontal outer portions of the first and second receiving conveyors are mounted side by side in a receiver housing that is supported on a ground surface when in the operating position, and comprising ramps on each side of the receiver housing, the ramps configured to enable the first and second transport vehicles to drive over the receiver housing in a direction substantially perpendicular to a longitudinal axis of the receiver housing.

11. The system of claim 10 wherein the first receiving station comprises a first opening in the receiver housing above the first receiving conveyor, and the second receiving station comprises a second opening in the receiver housing above the second receiving conveyor the first and second receiving stations spaced along the receiver housing such that the first and second transport vehicles discharge into the corresponding first and second receiver stations at the same time.

12. The system of claim 11 wherein the inclined inner portions of the first and second receiving conveyors are mounted in the receiver housing, and wherein the receiving conveyor assembly comprises a plurality of wheels rotatably mounted thereto under the inclined inner portions of the receiving conveyors the wheels oriented to roll in a direction substantially aligned with the longitudinal axis of the receiver housing, and a hitch assembly on an outer end of the receiver housing adapted for attachment to a towing vehicle to tow the receiving conveyor assembly in a forward direction.

13. The system of claim 12 wherein the receiving conveyor assembly comprises a connection bar rearward of the wheels, the connection bar configured to engage recesses in a base of the elevating conveyor assembly when the receiving conveyor assembly is in the operating position, and wherein when the receiving conveyor assembly is in the operating position, a rear portion of the receiving conveyor assembly is supported on the connection bar and the base of the elevating conveyor assembly.

14. The system of claim 1 further comprising stabilizer legs connected to the surge bin and movable from a stored position in proximity to the surge bin to an extended position extending outward from the surge bin.

15. The system of claim 14 further comprising stabilizer legs connected to the elevating conveyor assembly and movable from a stored position in proximity to the elevating conveyor assembly to an extended position extending outward from the elevating conveyor assembly.

16. The system of claim 1 wherein the distribution conveyor assembly is extendable such that the distribution conveyor outputs are movable from an inner location, closest to the surge bin, to an outer location.

17. The system of claim 16 further comprising first and second storage bins, and wherein in the distribution conveyor assembly is movable from a first storage bin loading position, where the output end of the distribution frame rests on the first bin with the first and second distribution conveyor outputs oriented to discharge granular material into the first storage bin, to a second storage bin loading position, where the output end of the distribution frame rests on the second bin with the first and second distribution conveyor outputs oriented to discharge granular material into the second storage bin.

18. The system of claim 17 wherein when the distribution conveyor assembly is in the first storage bin loading position the output end of the distribution frame engages a lock mechanism on the first storage bin, the lock mechanism operative to prevent movement of the distribution frame with respect to the first storage bin.

19. The system of claim 1 wherein when in the transport position the distribution conveyor assembly is located in a recess in the wall of the surge bin.

* * * * *